United States Patent Office 3,276,142
Patented Oct. 4, 1966

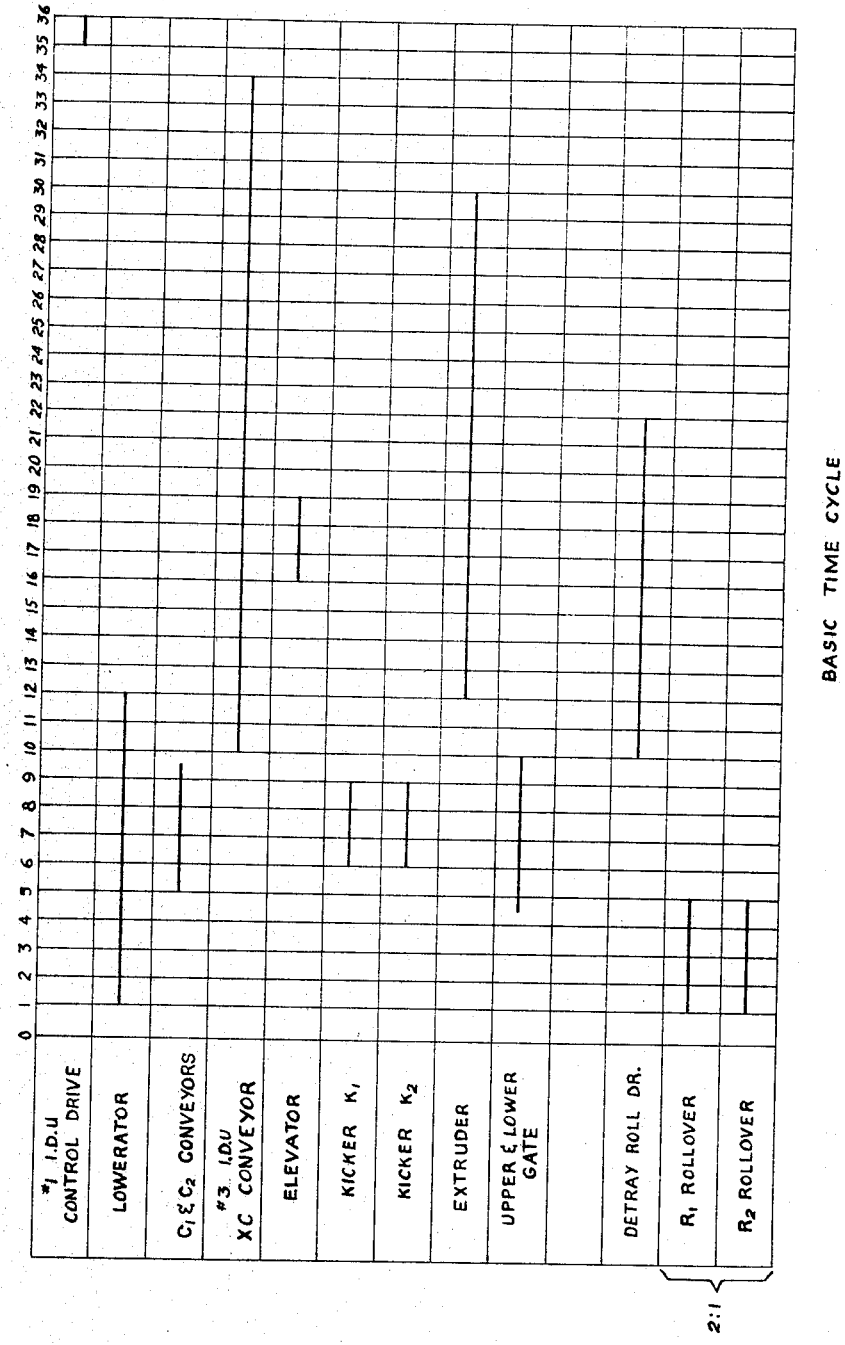

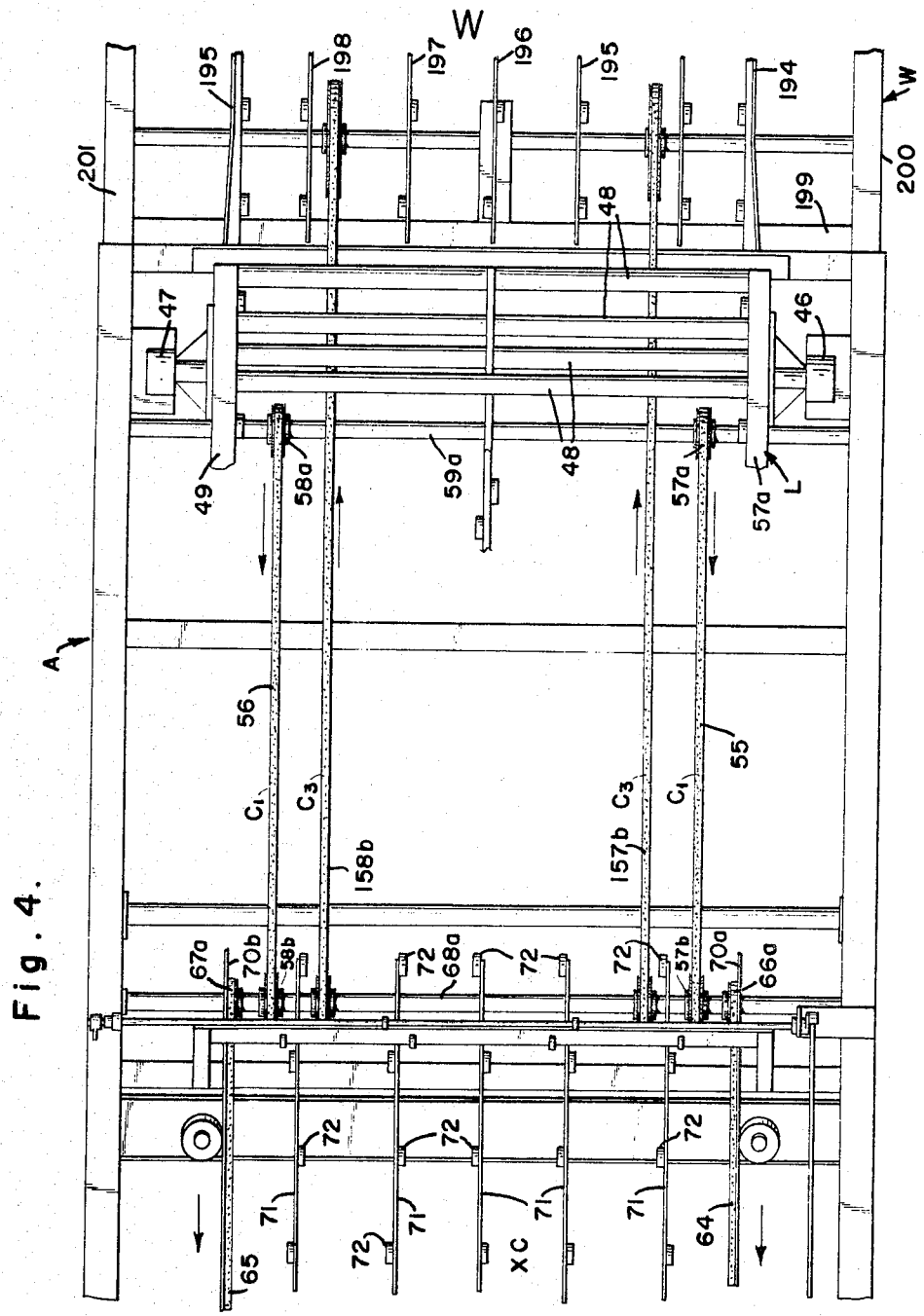

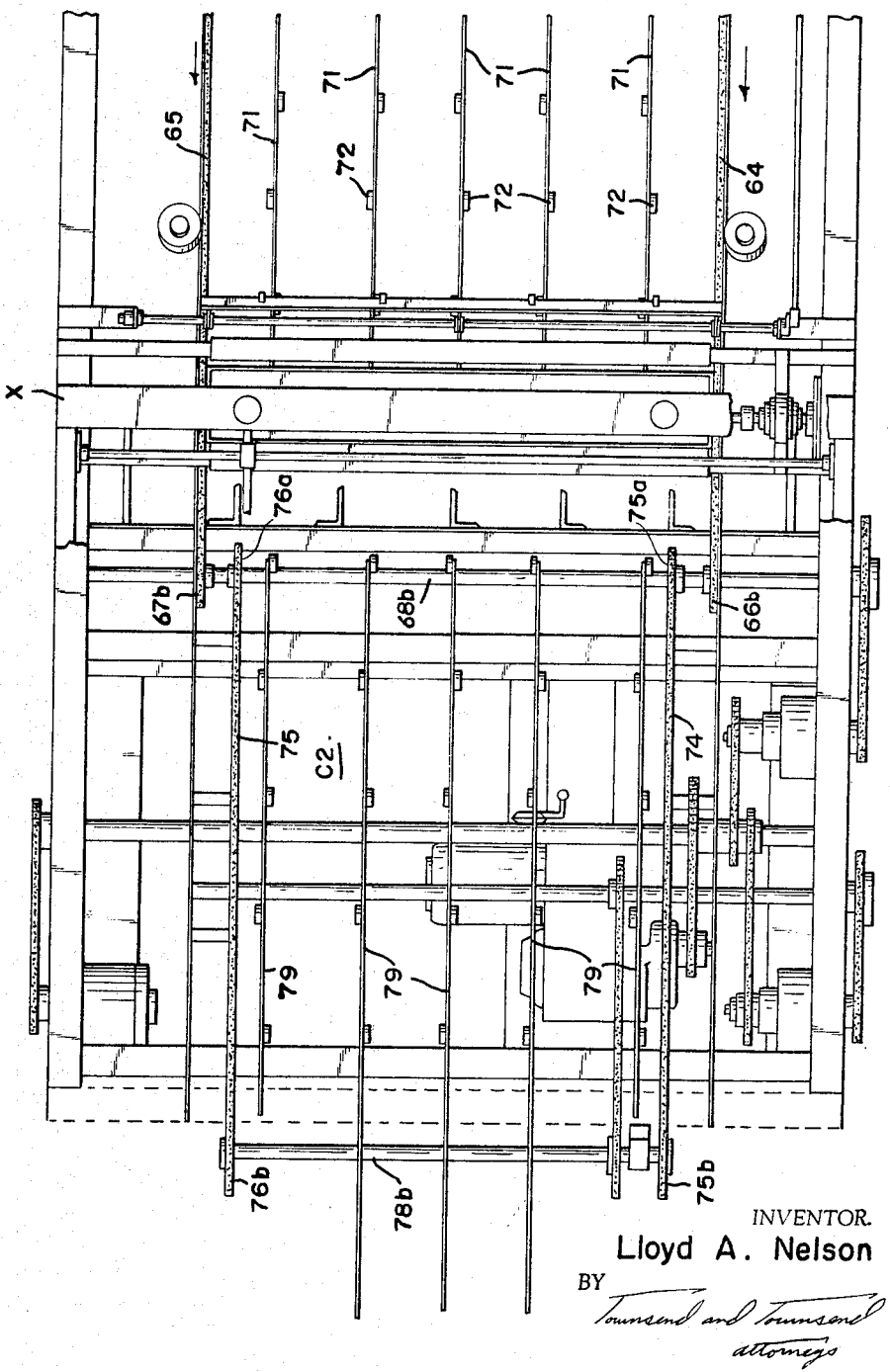

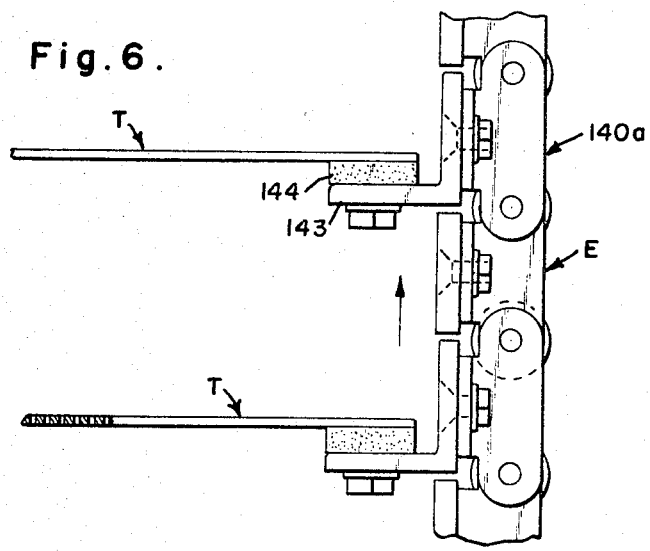
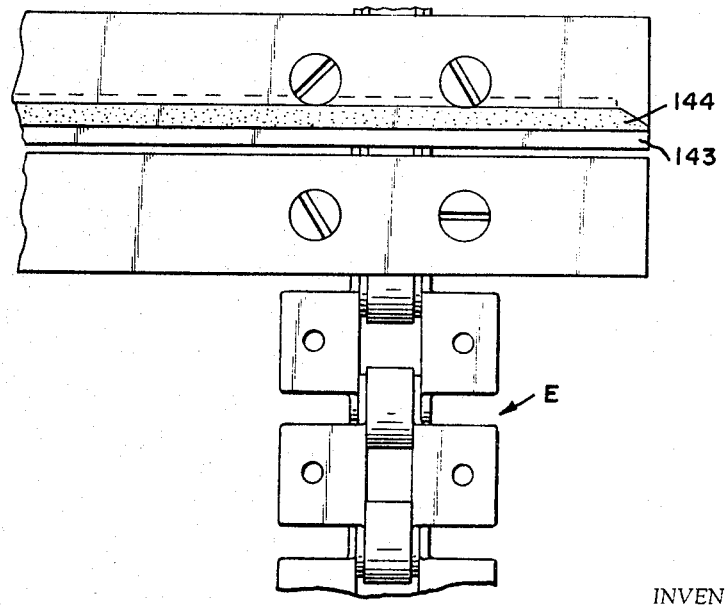

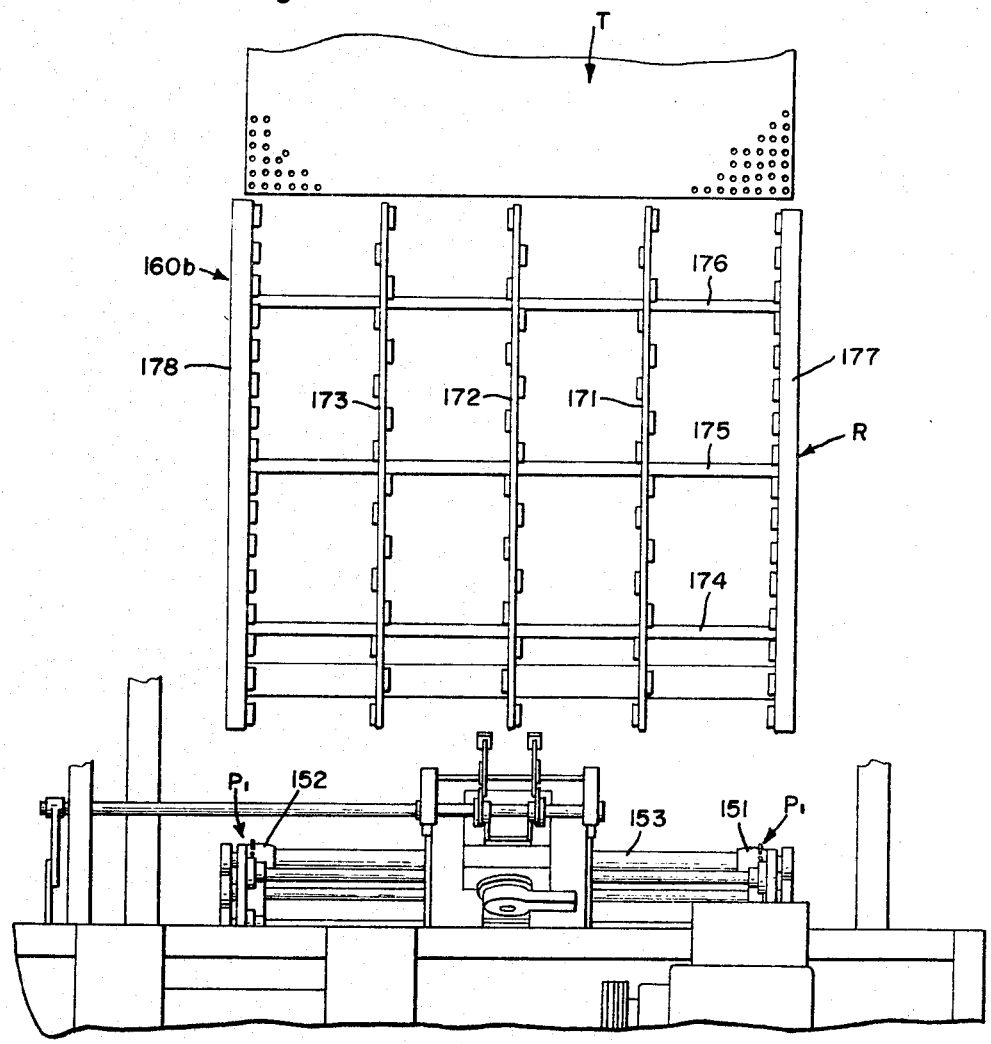

3,276,142
FOAM MAT DRIER
Lloyd A. Nelson, Fremont, Mich., assignor to Gerber Products Company, Fremont, Mich.
Filed Aug. 27, 1964, Ser. No. 392,551
11 Claims. (Cl. 34—189)

This invention relates to apparatus for drying a foam mat of moist material.

Foam mat drying is a new method of producing "instant" food powders for example in which a stable foam mat of gas impregnated moist food is dried by warm air. Rapid drying of this moist material results in an end product of high quality. The present apparatus is capable of rapid production rates while carefully controlling the drying temperature so as to achieve complete drying without adversely affecting the quality of the product. Other novel aspects of the apparatus result in an exceptionally compact unit offering ease of removal of the dried product.

In the preferred embodiment of this invention, there is provided an apparatus which operates to transfer flat perforated trays loaded with a thin sheet of moist foamy material, hereinafter referred to as a foam mat, through a plurality of stations for cyclically drying the material, removing the dried material from the tray, and recycling the empty trays. In operation the empty trays are sequentially fed under an extruder which deposits a thin sheet of foam material upon them as they move toward a drying chamber. Preferably, at some point between the drying chamber and the extruder, a cratering nozzle blows a blast of air against the bottom of a tray to form a plurality of crater-like perforations in the foam mat, one at each tray perforation to increase the drying rate. Once cratered, the foam mat is transferred inside the drying chamber and hot dry air at three different temperatures is directed against it as it is raised upwardly on an elevator. At the uppermost elevator position the tray of now dry foam mat material is removed from the dryer and transferred to a portion of the machine which operates to invert the tray and sequentially cool the material, remove the cooled material from the tray, and place the empty tray on the conveyor for refeed past the extruder for another complete cycle.

An object of this invention is to provide a foam mat dryer having a drying chamber which operates to hold the trays in vertically spaced apart relationship as they are lifted through the chamber thereby permitting the drying air to circulate freely between the trays for faster drying action.

Another object of this invention is to provide a foam mat dryer of the above type in which the control circuitry can be changed or varied to suit a variety of operating conditions and in which the tray transfer mechanism movement in each phase or portion of the machine can be varied independently of the other phases or portions of the machine.

Another object of this invention is to provide a mechanism for rotating the hot trays out of position after they are received from the dryer and to operably rotate another tray receiving member into position for receiving the next hot tray thereby providing a time delay which permits an extended cooling cycle without requiring long conveyor mechanism. An advantage of this resides in the fact that the installation space requirements of the drying apparatus are reduced substantially by allowing a time delay of one cycle between the drying oven and the product removal step.

Another object of this invention is to provide a rollover mechanism for the above type of mechanism which operates to invert the trays prior to the product removal step for improving removal of the dried product as it is fed past a scraper. A feature and advantage of this inverting resides in the fact that the scraped particles fall from the tray by gravity thereby reducing the possibility that the product will remain on the tray and cause an excess and deleterious build up of product during the subsequent cycle through the dryer.

Another advantage of inverting the tray prior to product removal is that the static electricity developed during product removal will be overcome by the gravitational forces and as a result loose particles will not be attracted to the tray.

Still another object of this invention is to provide a foam mat drier which can handle flat trays.

Another object of this invention is to provide a tray lowering mechanism which will hingeably swing downward to deposit the inverted trays upon the conveyor mechanism for subsequent feed past the extruder for another drying cycle. An advantage of this mechanism resides in the fact that the flat perforated trays do not have to be reinverted or rolled over but may be fed through the system in the inverted position.

It is an object of this invention to provide a foam mat drier of the above type which is capable of handling relatively large trays while requiring relatively small amount of floor space.

Another object of this invention is to provide foam mat drying apparatus in which the foam mat can be carried on flat trays which have no side walls so that the trays can be inverted in operation and recycled through the apparatus without the need for reinverting the trays.

Other objects, features, and advantages of this invention will become apparent upon reading the following detailed description of one embodiment of the invention and referring to the accompanying drawings in which:

FIG. 3 is a timing diagram for the control circuitry of FIG. 2;

FIGS. 4 and 5 are top plan views of the tray lowering mechanisms and lower horizontal conveyors and frame taken together;

FIGS. 6 and 7 are end elevational views of a portion of the oven elevator showing a tray in position thereon; and FIG. 8 is a top plan view of the tray inverting portion of the drier.

Figure 1:
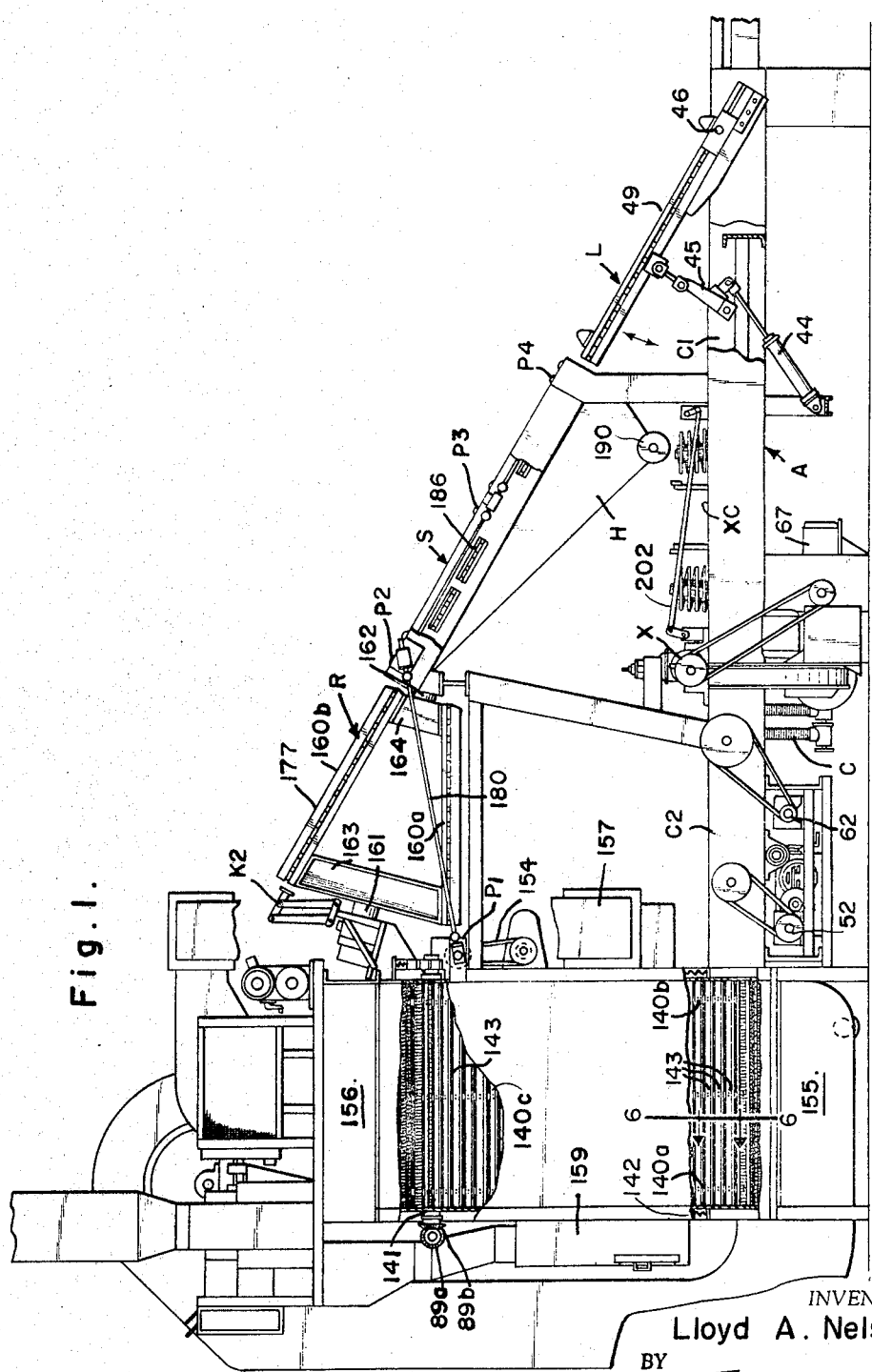
FIG. 1 is a side elevational view of the foam mat drier with portions of the oven wall broken away to show the tray elevator.

Referring to the drawings there is illustrated generally in FIG. 1 a side elevational view of a foam mat drier. A lower horizontal frame A has three conveyors $C_1$, XC and $C_2$ operatively connected thereto. The first of these conveyors, $C_1$, is operable to feed an empty tray to the relatively slow constant speed intermittently timed extruder conveyor XC whereat an extruder X deposits a thin sheet of moist foam mat material on top of the tray. Thereafter, the full tray is carried onto the third conveyor $C_2$ and over a cratering blower nozzle which directs a blast of air through the tray perforations to create crater-like perforations through the foam mat to increase the drying rate. At the proper instant a lower door on an oven opens to receive the tray of cratered foam mat material on an elevator E. As the tray is carried step-by-step from the bottom to the top of the oven, hot air at three different temperatures is directed against the trays. A bottom plenum chamber directs the hottest air at about 205° F. against the bottom of the trays while the intermediate plenum directs hot air at about 150° F. sideways through the trays, and the uppermost plenum directs air at about 130° F. downwardly onto the top of the uppermost trays. By the time the tray reaches the top of the oven the foam mat material is dry and the tray is removed or kicked from the oven by kicker $K_1$, through a cyclically open upper oven door, onto a rollover tray receiving mechanism R. With the hot tray of dry material on it, the rollover mechanism R revolves to move the tray upwardly and into inclined alignment with a product removal scraper mechanism S. At the proper instant between rollover steps, the upper inclined tray is kicked out of the rollover mechanism by a kicker $K_2$ and onto the scraper S where conventional scraper blades operate to remove the dried product which then falls into a product removal hopper H and is conveyed away by a screw conveyor located at the bottom thereof. As the tray is carried along the scraper mechanism S, it is fed onto a lowerator L which is hingedly connected to the main support frame A to lower the empty trays back onto the first conveyor $C_1$ for recycling through the drying apparatus.

Referring now to the schematic diagram of the control system of FIG. 2 and the timing chart of FIG. 3, an intermittent drive unit 20 hereinafter referred to as I.D.U. is initially actuated when a tray is fed onto lowerator or lowering device L to close the circuit to limit switch 21 positioned at the lower end thereof. As a result, solenoid 22 is actuated to close the power circuit to actuate I.D.U. 20. This I.D.U. is of a conventional type, such as made by the Hilliard Corporation, having a non-repeating action with anti-overrun and positive stop features. That it, after one complete cycle, I.D.U. 20 will stop in the initial start position.

Referring back to the intermittent drive unit input power circuitry, it is seen that closure of solenoid 22 by means of lowerator limit switch 21 closes solenoid switch 22 to complete the circuit from a negative terminal input bus bar or power lead 23a, over line 24, to the I.D.U. 20 and return back through line 25 to I.D.U. control disk 30a and switch 30b, which are operable to stop I.D.U. 20 at the end of a complete cycle.

Considering a full timing cycle to have 36 increments or time units, it is seen that a 36 to 1 reduction ratio gear can be connected between the output shaft of I.D.U. 20 and the timing disk unit 28. Each of timing disks 30a, 40a, 50a, 60a, 80a, 90a, 100a, 110a and 120a has a cam sector on it which is operable to actuate the associated switches 30b through 120b at specific intervals in order to sequentially operate each portion of the drier independently of other portions of the drier. The remaining control disk 130a is connected through a two-to-one step down gear mechanism to actuate the rollover mechanism R as will be explained shortly. As a result of this particular control arrangement, it is possible to adjust the entire drier system to a variety of different speeds, time cycles, and sequences without affecting the system operating speed or changing the operating speed of any of the particular integral components or drives for the trays. In such cases, the only changes that would have to be made would be in control disk mechanism 28.

In the representative timing cycle of FIG. 3, a complete cycle having 36 equal time units is chosen. Considering the start of the cycle to be when an empty tray trips the lowerator limit switch 21 to actuate I.D.U. 20 and rotate the timing disks, the lowerator control valve 43 is the first unit to be actuated by means of the lowerator control disks and switch 40a and 40b as the circuit through switch 40b is completed from power bus 23b up through lead 41 and to solenoid 42 of lowerator cylinder control valve 43. Actuation of control valve 43 reverses the fluid input to power cylinder 44 to retract the cylinder rod and pivot lever arm 45. As a result lowerator L is lowered into planar alignment with the conveyor chains $C_1$, whereupon the empty tray located on lowerator L is in position to be carried by the first conveyor chain $C_1$.

In order to carry this empty tray from the lowerator station, the first conveyor chain $C_1$ is started at the fifth time interval to feed the tray onto a slower constant speed intermittently timed extruder conveyor XC which in turn subsequently feeds the full tray onto the third conveyor $C_2$. Conveyors $C_1$ and $C_2$ are both connected to be actuated by timing disk 50a which closes limit switch 50b which is in turn connected to close the circuit from the power bus 23b over line 51 to intermittent drive unit 52. Once conveyor $C_1$ has been operated long enough to position the empty tray for pick up by the extruder conveyor XC the limit switch is again opened to stop conveyor $C_1$.

Since the timing disks are still being rotated at a constant speed, the extruder conveyor timing disk 60a is rotated into position at the tenth time interval to close the circuit through the limit switch 60a from the power bus 23b over line 61 and to the extruder conveyor intermittent drive unit 62, and back down to the other input bus 23a over line 63. With closure of the circuit, extruder conveyor intermittent drive unit 62 operates for a sufficient time interval to slowly move the empty tray beneath an extruder X whereat in the two spaced apart limit switches 65 and 66 are both contacted and closed by the leading edge of the tray to close the circuit to extruder feed motor 67 thereby causing the extruder X to deposit a thin sheet of foam mat material on top of the tray. Once the trailing edge of the tray has passed by one of these limit switches 65 and 66 the circuit is opened and the extruder deposit is stopped. Thus it is necessary to close both of limit switches 65 and 66 before the extruder will operate and as a result the foam mat material is deposited on the tray at a distance spaced from the leading edge and is stopped at a distance spaced from the trailing edge of the tray, each distance being equal to the spacing between the two limit switches 65 and 66. As previously stated, the extruder conveyor XC is driven in a very much slower rate than either conveyor $C_1$ and $C_2$ and, as a result, takes up a large portion of a complete timing cycle. As illustrated in the timing chart of FIG. 3 the extruder XC conveyor time cycle starts at the tenth time interval and ends at the thirty-fourth time interval. During this time the extruder X has been operating from the twelfth to the thirtieth time interval to deposit the thin sheet of foam mat material on top of the tray. As the control disk unit 28 continues to rotate the intermittent drive unit control disk 30a and switch 30b are actuated to stop the control disks at the thirty-sixth time unit.

In order to recycle the machine it is necessary for another tray to actuate the limit switch 21 on lowerator L. When this happens the master I.D.U. 20 is again actuated to start the timing disk unit 28 rotating. Lowerator L is again lowered to place an empty tray in position on the first conveyor $C_1$ which is thereafter actuated by the timing disk 50a to transport the empty tray to the extruder conveyor XC. Since conveyors $C_1$ and $C_2$ are driven from the same intermittent drive unit, the loaded tray of foam mat material is transported from extruder conveyor XC by the follow-up conveyor $C_2$ and transported into the oven through the now open lower oven gate 119b which has been actuated by timing disk 110a thereby providing a path for entrance into the elevator as will be explained shortly.

Before going on to describe the operation of the oven and elevator E, it is necessary to explain and describe the details of the lower tray conveying mechanism as illustrated in FIGS. 4 and 5. The lowerator L is pivotally connected to journal blocks 46 and 47 which are secured to the side rails of frame A. A plurality of rods 48 are mounted in spaced apart relationship along the two tray edge guide channels 49, a third support is located on machine center line, the edge guides and center support have mounted thereon a series of rollers 72 on which the trays are carried. Where lowerator L deposits a tray on conveyor $C_1$, two spaced apart continuous conveyor chains 55 and 56 transport the tray in direction of the arrow in timed relationship to the sequence of operation, this is accomplished by an arrangement of carrier chain lugs, there being two lugs on each chain and positioned to operate, so on completion of one cycle increment the lug will stop and position the tray in exact position for the following conveyor cycle increment to start, to effect transfer from conveyor $C_1$ to conveyor XC. The design of conveyor XC, conveyor $C_2$ and conveyor $C_3$, have similar lug arrangements and thereby transport and position trays accurately. Conveyor chain 55 and 56 are wrapped about idler sprockets 57a and 58a which are rotatably mounted on shaft 59a situated in transverse location between side rails of support frame A.

At the other end of conveyor chains 55 and 56 the chains are wrapped about drive sprockets 57b and 58b which are secured in keyed alignment on rotatable shaft 68a.

Extruder conveyor XC is somewhat of the same configuration as conveyor $C_1$ having a pair of spaced apart continuous conveyor chains 64 and 65 which are wrapped about idler sprockets 66a and 67a rotatable on shaft 68a. The spaced apart drive sprockets 66b and 67b are in keyed alignment and mounted on rotatable drive shaft 68b. The input end of extruder conveyor XC has a pair of tray receiving guide members 70a and 70b mounted adjacent to but outwardly of the conveyor chains so as to guide the trays and center them on the conveyor.

In order to support the trays and prevent the center portion of a loaded tray from sagging, a plurality of roller tracks 71 are mounted in parallel spaced apart relationship along the conveyor. The rollers 72 are positioned to contact the bottom of the tray and permit easy transfer of the tray along the conveyor.

As the empty tray passes beneath extruder X positioned or secured toward the downstream end of the conveyor, a thin sheet of foam mat material is deposited on top of the tray. After the foam mat material is deposited on the tray a cratering operation is performed in which a pressurized air stream is directed against the bottom of the perforated tray to perforate the foam mat material causing a plurality of crater-like holes to be formed in the material. Since this type of extruder and blower are conventional in the foam mat drying field, there is no need to explain them in detail but merely to consider them as being representative of one type that can be used.

The tray of cratered foam mat material is thereafter transferred to the next conveyor $C_2$ for subsequent feed into the drying chamber. Conveyor $C_2$ also has a pair of spaced apart continuous conveyor chains 74 and 75 wrapped around the idler sprockets 75a and 76a secured on the rotatable axle shaft 68b and the drive sprockets 75b and 76b are in keyed alignment on rotatable axle shaft 78b. A plurality of roller racks 79 which are similar to the roller rack of the extruder conveyor XC are secured in parallel spaced apart relationship along conveyor $C_2$ to transfer the full tray of cratered material without allowing substantial sag.

Referring back to the timing chart of FIG. 3, it is seen that the upper and lower oven gates are opened just prior to the time conveyor $C_2$ starts thereby permitting the tray of foam mat material to be transferred into the lowermost shelf of oven elevator E. As indicated in FIG. 2 the oven door timing disk and switch 110a and 110b operate to close the circuit from the input power bus 23b over line 111 to solenoid 112 for reversing the door control valve 113 to supply pressurized fluid over lines 115 to power cylinder 116. Cylinder 116 then operates on the lever arm 117 and 118 to open the upper elevator door 119a and the lower elevator door 119b, respectively. After sufficient time has elapsed to allow the tray of foam mat material to be fully inserted into the oven, the circuit to control valve 113 is again open to de-energize solenoid 112 whereupon the hydraulic pressure in lines 115 is reversed to close the oven doors.

Now referring to the details of elevator E, as illustrated in FIGS. 1, 5, and 6, there is included six vertically extending link belts 140a, 140b and 140c. At each oven corner is located 140a and 140b with 140c located equidistant between 140a and 140b. An upper sprocket drive 141 and the lower idler sprocket 142 receive the elevator chains and supply the momentum to raise the link belt chains on both sides simultaneously. Tray receiving shelves are formed by angle brackets 143 which are interconnected between pairs of link belts on each side of the oven and receive the edges of tray T as it is inserted into the oven. In addition a wear strip 144 is connected to the top of each angle bracket to reduce friction and aid in insertion and removal of the trays on the shelves.

As shown in detail in FIGS. 5 and 6, the continuous belt is of the link type having a plurality of interconnected links and rollers which cooperate with the sprockets of the drive unit to lift the trays within the oven. This lifting operation is step-by-step in which the elevator control timing disk and switch 80a and 80b close the circuit from input power lead 23b over line 81 through solenoid 82 and return to input power lead 23a over line 83. This switches valve 85 to reverse the fluid input over lines 86 into the elevator control cylinder 87. As a result, the elevator cylinder drive rod 88 reciprocates to drive the one way clutch lever arm 89 to rotate the two bevel gears 89a and 89b thus raising the elevator one step. Starting with the bottom tray on the oven it takes approximately twenty-one steps or full cycles to raise a tray of foam mat material from the lower inlet door to the upper outlet door for subsequent removal of the dried foam mat.

At the uppermost end of the step-by-step elevator operation, the tray is sequentially removed from the support shelves by means of kicker $K_1$ during a time interval when the upper oven gate or door 119a is open. It is only necessary to partially remove this tray by kicker $K_1$ since the pin drive unit $P_1$ operates to grip the row of holes along the edges of the tray by inserting pin wheels therein to draw the tray the rest of the way from the oven. This pin drive $P_1$ is better illustrated in the top plan view of FIG. 8 in which the pin wheels 151 and 152 are secured to rotatable shaft 153 which is in turn driven by a continuously running motor and chain drive 154. As a result, the tray removal operation is completely independent of the timing of the rest of the circuit and as a result adjustments in the timing remainder of the circuit does not affect the removal operation. Ideally, however, removal of the tray should be rather speedy and rapid and should only take a small portion of the time that the upper oven door or gate 119a is open.

During elevation within the oven, the trays are blasted at three different levels by hot air in which the lowermost plenum 155 direct the hottest dry air, say for instance 205° F., against the bottom of the lowermost tray. A top plenum 156 directs a blast of relatively cooler air (130° F). against the top of the uppermost tray. A side plenum 157 directs intermediate temperature air (150° F.) between the intermediate trays and out through the exhaust plenum 159 connected to the opposite side wall on the oven. As a result of this and louvers within the plenums, it is possible to create an air current or curtain between the upper and lower portion of the oven so that moisture absorbed by the hot air is exhausted without intermixing with any moisture in the lower temperature downward flow. It is estimated that: about 70% of the moisture will be removed from the foam mat by the first high temperature effect, about 25% of the moisture will be removed by the intermediate temperature cross flow effect and about 5% of the moisture will be removed by the downward effect. Conventional heating circuitry such as fans and heaters are connected to the top of the dryer and provide the hot air or heated air currents through appropriate duct means and blowers. Louvers are provided at the duct outlet to enable the heated air to be directed horizontally across one or more trays starting at a level somewhat below the center tray. A similar set of louvers can be located in the outlet duct 159 to control the removal of moist air.

Referring to rollover mechanism R, as the pin drive $P_1$ picks up a dried tray from the oven it transfers the tray onto the lower rectangular shelf 160a on rollover mechanism R. After allowing for complete removal of the tray from the oven the lowermost tray receiving frame 160a is rotated about the bearings 161 and 162 which are connected to the frame cross members 163 and 164, respectively. As a result, the tray receiving frame 160b will then be positioned in alignment with the lower pin drive $P_1$ while, what is now the lower tray receiving frame 160a, will be in the upper inclined position and in alignment with the incline scraper S.

Each of the tray support areas 160a and 160b has a plurality of roller racks 171, 172, and 173 connected in parallel relationship along the tray receiving area by means of the cross members 174 through 176. The tray edge guide channels 177 and 178 also have a plurality of rollers secured thereto which provide for ease of transportation of the tray as it is driven onto the rollover mechanism R.

Figure 2:
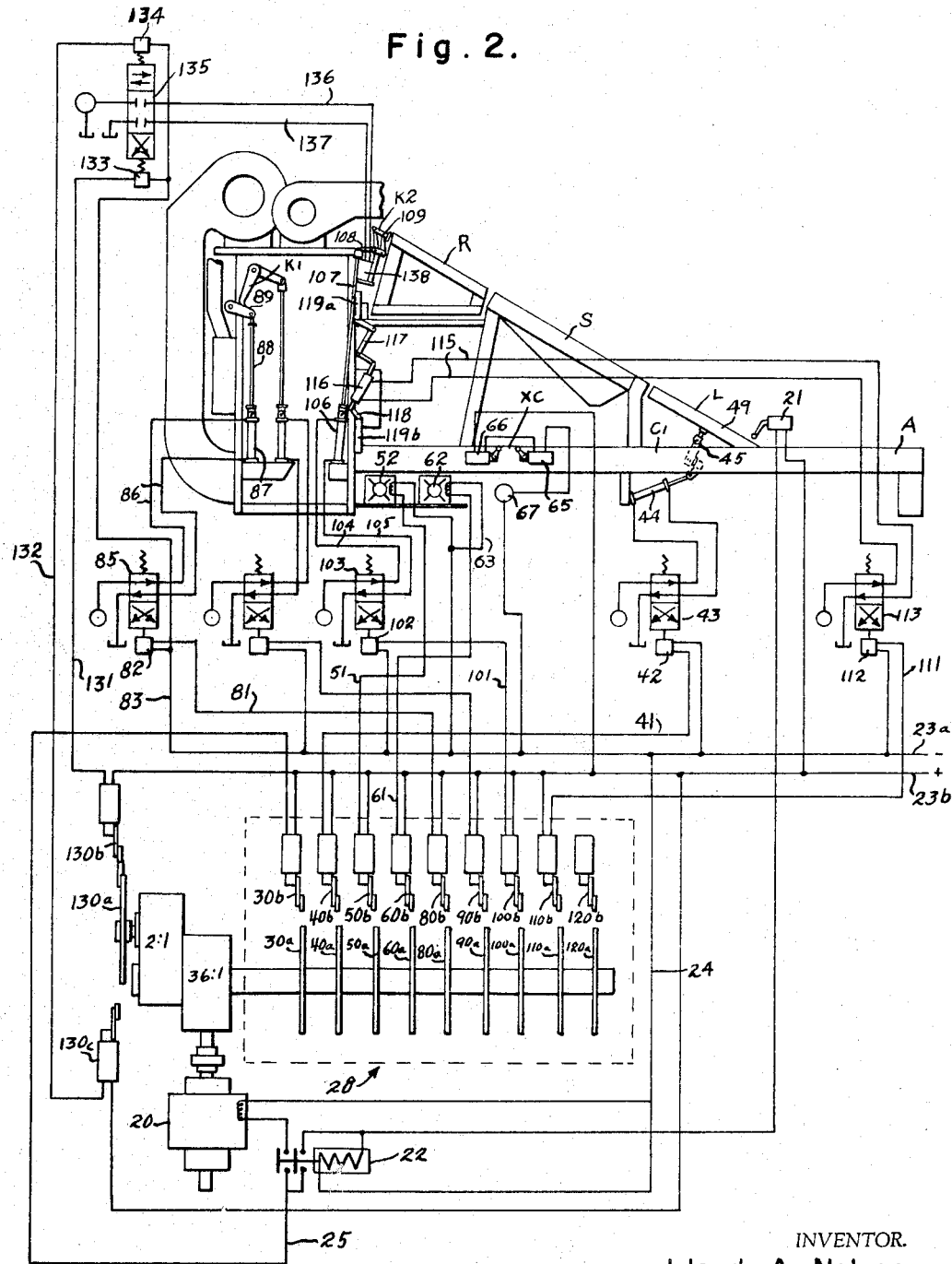
FIG. 2 is a schematic illustration of the foam mat drier and control circuitry.

Referring back to the control circuitry of FIG. 2, it is seen that the rollover mechanism is actuated by the control timing disk 130a and the two limit switches 130b and 130c. Appropriate energization of these switches operates to close the circuits from the input power bus 23b through the switches 130b or 130c to either of lines 131 or 132 to the solenoids 133 and 134 respectively of fluid control valve 135. The hydraulic fluid supplied over the lines 136 or 137 then operate to actuate the rollover drive mechanism 138 to rotate rollover R through 180°.

Referring now to kicker $K_2$ which partially removes or kicks the inverted tray from the upper inclined rollover area. It is seen that timing disk 100a closes the circuit through the limit switch 100b over line 101 to the switching solenoid 102 of fluid valve 103. Pressurized fluid is thereafter sent over the lines 104 or 105 to cylinder 106 to extend and retract the drive arm 107 thereby pivoting the linkage 108 to reciprocally move the kicker feet on the end of arm 109 into contact with the tray edge. After a short interval sufficient to allow the tray to be partially removed from the rollover mechanism, the limit switch 100b is again opened to reverse the hydraulic fluid direction to cylinder 106 to retract kicker arm 109.

Referring back to FIG. 1, it is seen that scraper mechanism S has a plurality of pin wheel drives $P_2$, $P_3$ and $P_4$ connected along the guide rails thereof. A power take off shaft 180 is connected to the upper tray extractor pin wheel drive $P_1$ so that chain drive 154 interdrives all of the pin wheels (also shown on FIG. 8 as 151 and 152). The pin wheels are free-wheeling overrunning in a forwardly direction on a continuous constant speed shaft which also rotates in a forward direction, this permits the pin wheels to rotate ahead of the drive and index with and engage into a series of equally spaced holes in the tray margins. Appropriately geared power takeoff means interconnects pin drives $P_2$, $P_3$ and $P_4$ with each other so that they all rotate simultaneously and at the same speed. Thus, as a tray is kicked by kicker $K_2$, it is inserted into position to be gripped along its edges by the pin drive $P_2$ and thereafter transported along the scraper S. Roller guides 185 are connected along each side rail 186 to guide the inverted tray along the scraper assembly. Scraper blades contained within this scraper assembly remove the product or separate the product from the tray whereupon the material drops into the hopper H and is carried away by the horizontal screw conveyor 190 located in hopper bottom.

The last scraper pin drive $P_4$ operates to remove the now empty tray T from the scraper assembly and to move it on to lowerator L. Once free of pin drive $P_4$, the tray drops by gravity along the rollers on lowerator L to close limit switch 21 as previously explained in reference to the schematic diagram of FIG. 2 whereupon another complete drying cycle is restarted. Lowerator L is thereafter hingedly lowered into horizontal position so that conveyor $C_1$ can transport the now empty tray through the machine.

If, however, the empty tray on conveyor $C_1$ is dirty or still has some material left on it, the conveyor $C_3$ can be reversed as schematically illustrated by the dotted arrows (FIG. 4) and transported away from the lowerator conveyor $C_1$ toward a washer assembly W. Appropriate guide rails 194 and 195 receive the edges of the tray while the conveyor chains 157b and 158b transport the tray along the roller racks 196, 197 and 198 toward a washer. The guide channels 194 and 195 also have a plurality or rollers secured thereto. Each of these roller guides and roller racks are supported on one end by the cross member 199 connected between the side rails 200 and 201 of the washer frame. Once the tray is clean the chains can be reversed to return the tray to conveyor $C_1$ or else a new tray can be substituted for it on conveyor XC, by tray inserting device 202, shown on FIG. 1.

Although one embodiment of this invention has been described and illustrated for purposes of explanation, changes can be made which are obvious to one ordinarily skilled in the art without departing from the invention which is only limited by the appended claims.

What is claimed is:

1. A foam mat drier of the type through which a plurality of perforated trays can be cycled comprising: conveyor means connected to cyclically move trays in a substantially horizontal direction; means operably connected to deposit stable foam mat of moist material thereon; elevator means connected to lift said trays from a lower loading station to an upper unloading station; drier chamber means enclosing said elevator; hot air flow means directed into said drier chamber for evaporating moisture from said foam mat; rollover means connected to sequentially receive the tray from the unloading station and to invert the tray; foam mat removing means connected to receive the inverted tray from said rollover means and being operable to remove the dried foam mat from the inverted trap; tray lowering means connected to receive the empty tray from said foam mat removing means and to lower the empty tray onto said conveyor means.

2. The foam mat drier of claim 1 in which said elevator includes a plurality of spaced tray receiving shelves each adapted to hold the trays in vertically spaced apart relationship to define a path therebetween for hot air flow.

3. The foam mat drier of claim 1 in which said hot air flow means includes lower, intermediate, and upper second hot air ducts connected to said chamber, said lower hot air duct being connected to direct a flow of relatively high temperature dry air upward against the bottom of the lowermost trays on said elevator; said intermediate hot air duct being positioned to direct a flow of intermediate temperature dry air between trays on said elevator at a vertical level between the loading level and the unloading level, and said upper hot air duct being positioned to direct a flow of hot dry air of a relatively low temperature downward against the top of the uppermost trays, whereby said intermediate lower duct creates an air curtain between the upward and downward flows of air.

4. A foam mat drier system of the type using a plurality of trays including: a drier chamber means; conveyor means connected to transport the trays from a tray input station to said drier chamber; extruder means connected to deposit a thin sheet of moist material on trays being transported along said conveyor; elevator means surrounded by said drier chamber being connected to receive and elevate the trays of moist material from a lower loading means to an upper unloading means;

hot air duct means connected to direct hot dry air against trays of moist material being elevated within the drying chamber for evaporating moisture therefrom; exhaust duct means connected to exhaust the moist air from said drier chamber; rollover tray inverting means including at least first and second tray receiving members operably positioned to sequentially receive the trays of material from the unloading means; drive means connected to rotate the tray inverting means from a first position to a second position and invert the tray receiving members and tray contained therein to an inverted position, and inclined product removal means connected to receive the inverted tray of material from the rollover means and transport it relative to a product scraper means to remove the material from the tray as it moves past; tray lowering means pivotally connected to receive empty trays from the product removal means; drive means connected to move said lowering means from a first tray receiving position to a second position whereat the tray is transferred onto said conveyor for cycle through the drier system.

5. The foam drying system of claim 4 in which the inverted tray receiving member, said product removal means, and said tray lowering means are all coplanar and inclined relative to the conveyor to provide an inclined path for travel of the inverted trays.

6. The foam mat drying system of claim 5 in which said tray lowering means is operable to receive an empty tray from the product removal means in a first inclined position and to hingedly lower the tray onto said conveyor for tray feed in a substantially horizontal position.

7. In a foam mat drying system of the type in which the mat material is transported on a plurality of trays, the invention comprising: a drier chamber; a conveyor connected to sequentially convey the trays from a tray loading station to said drier chamber; extruder means connected to deposit a thin sheet of foam material on top of the conveyed trays at a station between the tray loading station and said drier chamber; tray transporting means connected to transport the trays of foam material within the drier chamber between a drier chamber input station and a drier chamber output station; tray inverting means including at least one tray receiving member, said tray inverting means being connected to selectively rotate from a first position with the tray receiving member being positioned to receive a tray from the drier unloading station to a second position in which the tray is in an inverted position; product removal means connected to receive trays from the second position of said tray inverting means; first tray kicker means connected to transfer the tray from the output station of said drier chamber to the tray receiving member of said tray inverting means when in the first position; and second tray kicker means connected to transfer the tray from the tray inverting means to said product removal means when in the second position.

8. The foam mat drying system of claim 7 in which said tray inverting means includes a second tray receiving member attached in opposed relationship to said tray receiving member, said second tray receiving member being adapted to be alternately rotated from a first tray inverting position to a second tray receiving position when said first tray receiving member is respectively in the second tray receiving position and is rotated to the first tray inverting position.

9. The foam mat drier system of claim 8 in which said first and said second tray kicker means are operable respectively to simultaneously transfer a tray from the drier unloading station onto a tray receiving member and to transfer an inverted tray from an inverted tray receiving member onto said product removal means.

10. The foam mat drier system of claim 9 in which said tray inverting means includes a drive means connected to rotate the receiving members from the first to the second positions; and timing means connected to actuate said drive means subsequent to kicker operation.

11. A drier system of the type using a plurality of substantially flat trays to carry moist material comprising: drier chamber means having tray loading and tray unloading station; conveyor means connected to sequentially convey trays from a tray input station to the drier chamber tray loading station; extruder means connected to deposit a thin sheet of material on the trays as they are conveyed between the tray input station and the drier loading station; elevator means connected to elevate the trays of material from the drier loading station to the drier unloading station; rollover means connected to rotate between a first position and a second inclined position, said rollover means including at least one tray receiving member connected to receive trays from the drier chamber unloading station when said rollover means is in the first position and to invert the tray to a second position when the rollover means is rotated to its second inclined position, inclined mat removal means connected to receive a tray from said tray receiving member to remove the foam mat therefrom whereby the material falls from the tray by gravity.

References Cited by the Examiner

UNITED STATES PATENTS 1,311,890   8/1919   Helm _____ 34—189
1,881,062   10/1932  Randolph _____ 34—189

FREDERICK L. MATTESON, JR., *Primary Examiner.*

C. R. REMKE, *Assistant Examiner.*